United States Patent
Yu et al.

(10) Patent No.: US 7,023,918 B2
(45) Date of Patent: Apr. 4, 2006

(54) COLOR MOTION ARTIFACT DETECTION AND PROCESSING APPARATUS COMPATIBLE WITH VIDEO CODING STANDARDS

(75) Inventors: Siu-Leong Yu, San Jose, CA (US); Yi Liu, San Ramon, CA (US); Kou-Hu Tzou, San Jose, CA (US)

(73) Assignee: ESS Technology, Inc., Fremont, CA (US)

( * ) Notice: Subject to any disclaimer, the term of this patent is extended or adjusted under 35 U.S.C. 154(b) by 349 days.

(21) Appl. No.: 10/159,805

(22) Filed: May 30, 2002

(65) Prior Publication Data

US 2003/0223500 A1 Dec. 4, 2003

(51) Int. Cl.
*H04N 7/12* (2006.01)
*H04B 1/66* (2006.01)

(52) U.S. Cl. .................................. 375/240.12
(58) Field of Classification Search ........... 375/240.27, 375/240.24, 240.12, 240.04, 240.16, 240.26, 375/240.03; 382/236; H04N 1/66, 7/12; H04B 1/66
See application file for complete search history.

(56) References Cited

U.S. PATENT DOCUMENTS

| | | | | |
|---|---|---|---|---|
| 5,260,782 A | * | 11/1993 | Hui | .................. 375/240.15 |
| 5,544,263 A | | 8/1996 | Iwamura | |
| 5,987,180 A | * | 11/1999 | Reitmeier | .................. 382/236 |
| 6,094,455 A | * | 7/2000 | Katta | .................. 375/240.05 |
| 6,674,804 B1 | * | 1/2004 | Eshet et al. | ............ 375/240.26 |
| 6,765,962 B1 | * | 7/2004 | Lee et al. | ............. 375/240.03 |
| 6,823,015 B1 | * | 11/2004 | Hall et al. | ............. 375/240.24 |
| 2002/0044605 A1 | * | 4/2002 | Nakamura | ............. 375/240.04 |
| 2003/0012286 A1 | * | 1/2003 | Ishtiaq et al. | .......... 375/240.27 |

* cited by examiner

Primary Examiner—Tung Vo
(74) Attorney, Agent, or Firm—Farjami & Farjami LLP (57) ABSTRACT

To detect color motion artifacts in a video frame, a motion-compensated color-distance value is compared against a threshold value. If the motion-compensated color-distance value is greater than or equal to the threshold value, color-motion artifacts are detected. The motion-compensated color-distance value is a sum of absolute values of the differences between corresponding pixel values of the video frame and a reference frame. To detect color motion artifacts in a video frame, in another embodiment, luminance and chrominance components of the intra-frame activity levels are compared against luminance and chrominance components of the inter-frame activity levels. If any of the components of the inter-frame activity levels is greater than the corresponding components of the intra-frame activity levels, color-motion artifacts are detected. To reduce color-motion artifacts, either a smaller quantization scale or intra-frame encoding is used to encode the data.

21 Claims, 3 Drawing Sheets

COLOR MOTION ARTIFACT DETECTION AND PROCESSING APPARATUS COMPATIBLE WITH VIDEO CODING STANDARDS

BACKGROUND OF THE INVENTION

The present invention relates to processing of video data, and more specifically to detection and reduction of color-motion artifacts in processing of video data.

Successive frames in a typical video sequence are often very similar to each other. For example, a sequence of frames may have scenes in which an object moves across a stationary background, or a background moves behind a stationary object. Consequently, many scenes in one frame may also appear in a different position of a subsequent frame. Video systems take advantage of such redundancy within the frames by using predictive coding techniques, such as motion estimation and motion compensation, to reduce the volume of data required in compressing the frames.

In accordance with the well-known motion estimation technique, to conserve bit rate, data related to the differences between positions of similar objects in successive frames are captured by one or more motion vectors. The motion vectors are then used to identify the spatial coordinates of the shifted objects in a subsequent frame. The motion vectors therefore limit the bit rate that would otherwise be required to encode the data associated with the shifted objects.

Motion estimation and compensation are used in several international standards such as H.261, H.263, MPEG-1, MPEG-2, and MPEG-4. Partly due to its computational intensity, a motion vector is shared typically by all color components in (Y,U,V) or (Y, $C_r$,$C_b$) coordinate systems. In the (Y,U,V) color coordinate system, Y is the luma component (also referred to below as the luminance and is related to the intensity), and U and V are the chroma components (also referred to below as the chrominance components and are related to hue and saturation) of a color. Similarly, in the (Y, $C_r$,$C_b$) color coordinate system, Y is the luma component, and $C_b$ and $C_r$ are the chroma components. Each motion vector is typically generated for a macroblock. Each macroblock typically includes a block of, e.g., 16×16 or 8×8 pixels. The MPEG-2 standard provides an interlaced mode that separates each 16×16 macroblock into two 16×8 sub-macroblocks each having an associated motion vector. In the following, the terms block, macroblock, and sub-macroblock may be used interchangeably.

To simplify computation, most commonly known video standards use only the luminance component to generate a motion vector for each macroblock. This motion vector is subsequently applied to both chroma components associated with that macroblock. The generation of a motion vector using only the luminance component may cause undesirable color-motion artifacts (alternatively referred to hereinbelow as color artifacts) such as color patches.

To further the reduce bit rate for encoding of video data, inter-frame and intra-frame encoding have been developed. In accordance with the inter-frame coding, the difference between the data contained in a previous frame and a current frame is used to encode the current frame. The inter-frame encoding may not improve coding efficiency, for example, if the current frame is the first frame in a new scene (i.e., when there is a scene change), in which case intra-frame encoding is used. In accordance with the intra-frame encoding, only the information contained within the frame itself is used to encode the frame.

Figure 1:
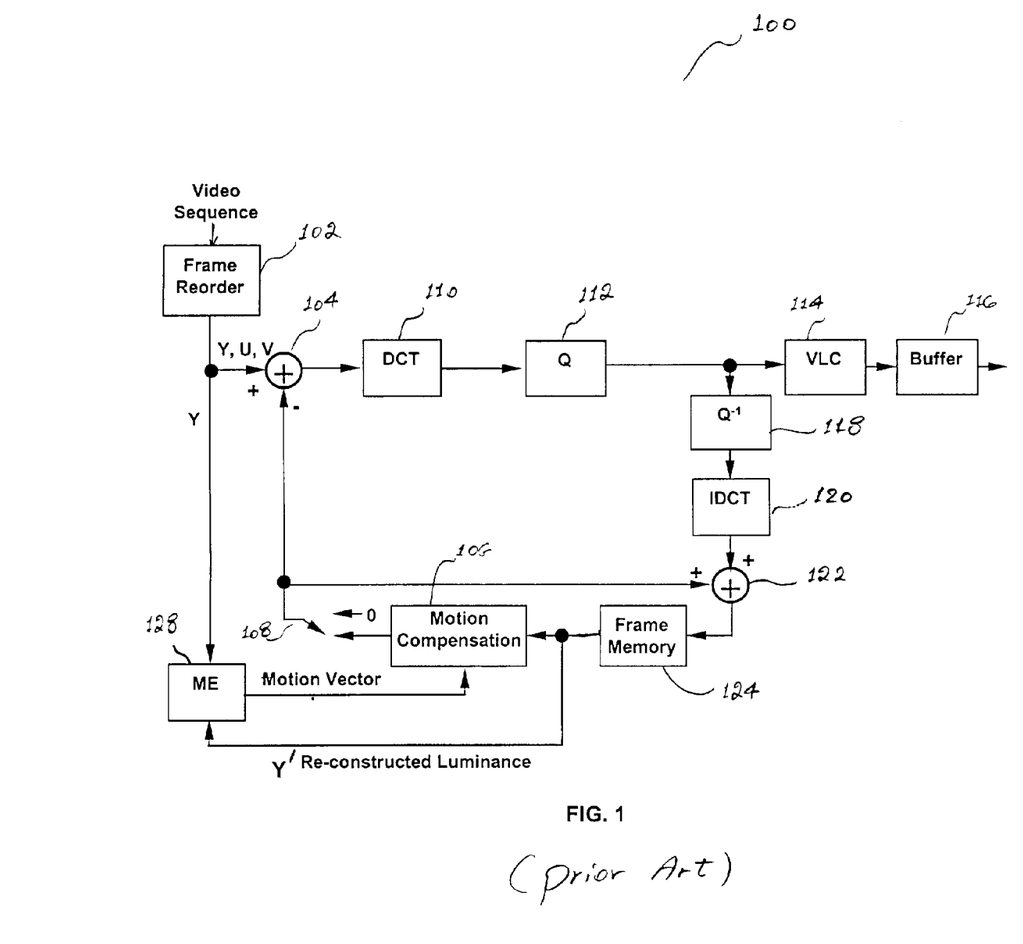
FIG. 1 is a simplified high-level block diagram of a conventional luminance-only based system adapted to detect color motion artifacts.

FIG. 1 is a simplified high-level block diagram of a conventional system 100 adapted to detect color-motion artifacts. System 100 receives a sequence of incoming video frames via frame reorder block 102. In response, frame reorder block 102 serially supplies the (Y,U,V) components of a current frame of the frame sequence to an adder/subtractor 104. Adder/subtractor 104 is also adapted to receive a signal from motion compensation block 106 via selector 108. If selector 108 is in the upper position, then intra-frame coding is used in which case a null signal (i.e., 0) is supplied to adder/subtractor 104. On the other hand, if selector 108 is in the lower position, then inter-frame coding is used. Adder/subtractor 104 generates a signal that corresponds to the difference between the video data supplied by frame reorder block 102 and that supplied by selector 108.

The signal generated by adder/subtractor 104 is supplied to a discrete cosine transform (DCT) block 110 whose output signal is quantized by a quantizer 112. The quantized signal generated by quantizer 112 is then encoded by variable-length coder (VLC) 114. The signal encoded by VLC 114 is then stored in buffer 116, which in turn, supplies the encoded video bit stream to a video decoder (not shown).

The signal generated by quantizer 112 is inversely quantized by an inverse quantizer 118 and is subsequently delivered to an inverse DCT (IDCT) 120. IDCT 20 performs an inverse DCT function on the signal it receives and supplies that signal to adder 122. Adder 122 adds the signal it receives from selector 108 to the signal it receives from IDCT 120 and stores the added result in frame memory 124 for future retrieval. The signal stored in frame memory 124 only includes the luma component of a current frame and is adapted to serve as a reference frame for motion estimation and compensation of future frames.

A motion estimator 128 receives the signal stored in frame memory 124 and the signal supplied by frame reorder block 102 to generate a motion vector signal that is supplied to motion compensation block 106. Only the luma components of the current frame—as supplied by frame reorder block 102—and the reference frame—as supplied by frame memory 124—are received and used by motion estimator 128 to generate a motion vector. The motion vector generated by motion estimator 128 is supplied to motion compensator 106. Motion compensator 106, in turn, compensates for the motion of the signal it receives from frame memory 124 using the motion vector signal that it receives from motion estimator 128. The output signal generated by motion compensator 106 is a motion-compensated signal of a current frame and serves as the reference frame for the next incoming frame when inter-frame encoding is used.

There may be occasions when a reference frame is not required. For example, no reference frame is required when a new video sequence is received by system 100. Similarly, there is no need for a reference frame when processing the first frame of a new scene. To accommodate situations where no reference frame is needed, selector 108 is provided with an upper position. When placed in the upper position, a null signal (i.e., 0) is transferred to subtracted 104.

Figure 2:
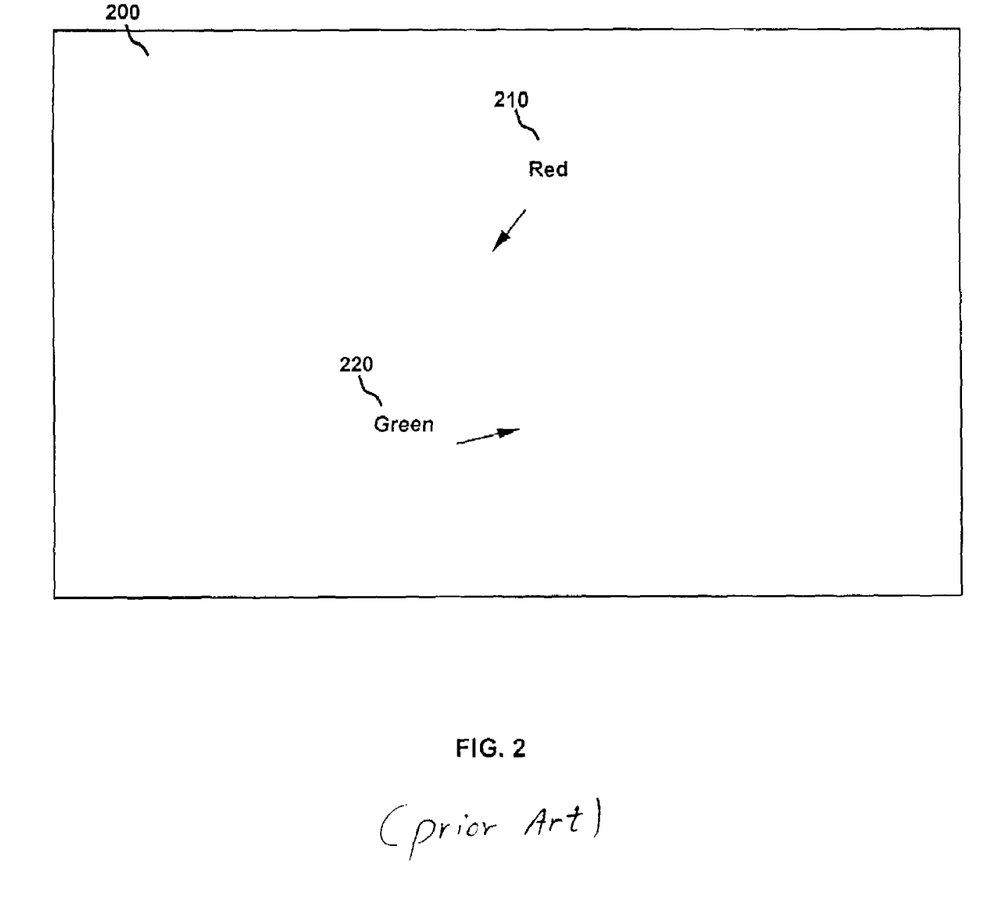
FIG. 2 is an exemplary diagram of a color-motion artifacts caused by the system of FIG. 1.

Conventional luminance-only based motion estimation and compensation systems, such as system 100, fail to reflect the true movement of an object in a video sequence. This failure results in noticeable color-motion artifacts. FIG. 2 is an exemplary diagram showing color-motion artifacts stemming from failure to detect the motion of a color object. In FIG. 2, a uniform gray area 200 provides a background to two synthetic color patches, namely a red color patch 210 and a green color patch 220. Both red and green color patches 210 and 220 produce the same luminance level as gray background 200. Both color patches 210 and 220 are also moving in front of gray background 200.

Assume that in FIG. 2, the color conversion recommended by the ITU-R standard BT.709 is used, as shown below:

$$Y=0.715G+0.072B+0.213R.$$

Assume further that gray background 200 has (R,G,B) color components of (40,40,40) resulting in a luma component (i.e., intensity level) of 40. Assume further that red color patch 210 and green color patch 220 have respective (R,G,B) color components of (188,0,0) and (0,56,0). Consequently, in accordance with equation (1) above, both red color patch 210 and green color patch 220 have the same luminance level (i.e., 40) as the gray background 200. Therefore, conventional luminance-only based motion estimation and motion compensation systems, such as system 100 of FIG. 1, fail to detect the movement of red and green color patches 210 and 220 relative to gray background 200. This failure results in noticeable differences in the quantization errors of the chroma components—particularly for the gray background—thereby creating color motion artifacts.

One known method for overcoming the problems associated with luminance-only motion estimation and compensation systems is described in U.S. Pat. No. 5,544,263 and which involves performing motion estimation for each of the color components (Y,U,V). This three-motion-vector method, while achieving a good match for each of the color components, substantially increases the computational intensity. The increase in computational intensity, increases both the cost of the system as well as the bandwidth requirement for transmitting the three motion vectors. This, in turn, limits the available bit rate to encode the motion-compensated inter-frame differences. Therefore, although the method as described in U.S. Pat. No. 5,544,263 has an improved color motion artifact rejection, because it provides less bandwidth to encode the inter-frame differences, it is less immune to granular noise.

Another known method for overcoming the problems associated with luminance-only motion estimation and compensation systems is described in U.S. Pat. No. 5,544,263 and which involves using all color components when matching blocks. In accordance with this method, block-matching for each macro block is performed only once. However, this technique may require 50% more computation than do the luminance-only motion-estimation and compensation systems. This 50% increase in computation increases the system complexity and cost.

Need continues to exist for improved color motion artifact detection and reduction techniques.

BRIEF SUMMARY OF THE INVENTION

In accordance with one aspect of the present invention, to detect color motion artifacts in a video frame block, a motion-compensated color-distance value associated with that frame block is compared against a threshold value. If the motion-compensated color-distance value associated with the frame block is greater than or equal to the threshold value, the frame block is identified as containing color-motion artifacts.

In one embodiment, the motion-compensated color-distance value is defined by a sum of squared distances of corresponding red, green and blue component values of similarly positioned pixels of the frame block and an associated reference frame block. In another embodiment, the motion-compensated color-distance value is defined by a sum of absolute values of differences of corresponding luminance and chrominance component values of similarly positioned pixels of the frame block and an associated reference frame block. In one embodiment, the threshold value is defined by a level of activity within the frame block. In another embodiment, the threshold value is defined by a target bit rate allocated for encoding the frame block.

In accordance with another aspect, to detect color-motion artifacts, chroma and luma components of the intra-frame activity levels of a video frame are compared to chroma and luma components of the inter-frame activity levels for that video frame block. If any component of the inter-frame activity levels is greater than the corresponding component of the intra-frame activity level, the frame block is identified as containing color motion artifact(s).

In accordance with another aspect of the present invention, to reduce any detected color-motion artifacts either (1) a smaller quantization scale or (2) intra-frame—in place of inter-frame—is used to encode the data.

DETAILED DESCRIPTION OF THE INVENTION

In accordance with one aspect of the present invention, to detect color-motion artifacts in a video frame, a motion-compensated color-distance value is compared to a threshold value. If the motion-compensated color-distance value is greater than or equal to the threshold value, the video frame is identified as containing color-motion artifacts. In accordance with another aspect, to detect color-motion artifacts in a video frame, chroma and luma components of the intra-frame activity levels of a video frame are compared to chroma and luma components of the inter-frame activity levels for that video frame. If any of the components of the inter-frame activity levels is greater than the corresponding component of the intra-frame activity levels, the video frame is identified as containing color motion artifacts. In accordance with another aspect, to reduce any color-motion artifacts, either (1) a smaller quantization scale or (2) data is encoded using intra-frame encoding.

Motion-Compensated Color-Difference Value

To detect color-motion artifacts in each block of a video frame, first a motion-compensated color-distance value for that block (alternatively referred to hereinbelow as the current block or the underlying block) is computed, as described further below. Assume that the red, green and blue components of a video signal associated with a pixel disposed at coordinates (i,j) of the current block of a video frame are respectively represented by $r(i,j)$, $g(i,j)$, and $b(i,j)$. Assume further that the red, green and blue components of a video signal associated with a pixel disposed at coordinates (i,j) of a corresponding block of a reference frame is represented by r'(i,j), g'(i,j), and b'(i,j). In accordance with the present invention, the motion-compensated color-difference value D is computed using the following equation:

$$D = \sum_i \sum_j \{[r(i,j) - r'(i,j)]^2 + [g(i,j) - g'(i,j)]^2 + [b(i,j) - b'(i,j)]^2\} \quad (1)$$

As is seen from equation (1), the double summation to compute D is performed over all the pixels of the current block.

As is known to those skilled in the art, the color transformation between RGB and YUV color coordinate system is as follows:

$R = Y + 1.574V \cong Y + 1.5V$ $G = Y - 0.187U - 0.469V \cong Y - 0.5V$ $B = Y + 1.856U \cong Y + 2U$ Accordingly, equation (1) expressed in the YUV color coordinate system is as follows:

$$D \cong \sum_i \sum_j \{[(y(i,j) - y'(i,j)) + 1.5(v(i,j) - v'(i,j))]^2 + [(y(i,j) - y'(i,j)) - 0.5(v(i,j) - v'(i,j))]^2 + [(y(i,j) - y'(i,j)) + 2(u(i,j) - u'(i,j))]^2\} \quad (2)$$

where y(i,j), u(i,j), and v(i,j) represent the luminance and chrominance components of the pixel disposed at coordinates (i,j) of the current block. Similarly, y'(i,j), u'(i,j), and v'(i,j) represent the luminance and chrominance components of the pixel disposed at coordinates (i,j) of the reference block. Ignoring the cross terms, equation (2) may be simplified, as shown below:

$$D \cong \sum_i \sum_j \{3[y(i,j) - y'(i,j)]^2 + 4[u(i,j) - u'(i,j)]^2 + 2.5[v(i,j) - v'(i,j)]^2\} \quad (3)$$

Equation (3) may be further simplified by replacing the square operator with the absolute value operator, as shown below:

$$D \cong 3\sum_i \sum_j |y(i,j) - y'(i,j)| + 4\sum_i \sum_j |u(i,j) - u'(i,j)| + 2.5\sum_i \sum_j |v(i,j) - v'(i,j)| \quad (4)$$

In equation (4), the following term:

$$\sum_i \sum_j |y(i,j) - y'(i,j)|$$

is alternatively referred to hereinbelow as the sum of absolute difference $SAD_y$ for component Y. Similarly the other two summations are alternatively referred to as $SAD_u$ and $SAD_v$. Accordingly, for each block, the motion-compensated color-distance value D is a sum of absolute difference (SAD) of the YUV components.

The constant coefficients (i.e., 3, 4 and 2.5) in equation (4) may be scaled to match human color-perception. Consequently, equation (4) may be expanded into a linear combination of the following three summations:

$$D \cong a_y \sum_i \sum_j |y(i,j) - y'(i,j)| + a_u \sum_i \sum_j |u(i,j) - u'(i,j)| + a_v \sum_i \sum_j |v(i,j) - v'(i,j)| \quad (5)$$

where $a_y$, $a_u$, and $a_v$ are constant coefficients.

To determine whether the block includes color-motion artifact(s), the motion-compensated color-distance value D computed for the block is compared against a pre-defined threshold value T. If the motion-compensated color-distance D is greater than or equal to threshold T, the block is identified as containing color-motion artifacts, as described further below.

Calculation of the Threshold Value

The threshold value T used to determine whether a block contains color-motion artifact(s), may depend on a number of factors, such as the activity level or the target bit rate allocated for the block. A low activity level indicates that there are smooth transitions in the pixel values disposed in the block, accordingly, a relatively low threshold is selected in identifying potential color motion artifacts in such blocks. On the other hand, a relatively high activity level indicates that there are abrupt transitions in the pixel values disposed in the block, accordingly, a relatively high threshold is selected in identifying potential color motion artifacts in such blocks. Therefore, the threshold value selected for identification of potential color motion artifacts is directly proportional to the level of activity in the block.

As described above, another factor that is used in establishing the threshold value is the target bit rate allocated for the block. A relatively high threshold is selected when a low target bit rate is allocated for encoding the block. Conversely a relatively low threshold is selected when a high target bit rate is allocated for encoding the block. Therefore, the threshold value selected for identification of potential color motion artifacts is inversely proportional to the target bit rate allocated for encoding the block.

The following is an example of a pseudo code for selecting the threshold value T:

```
CalculateMismath_Threshold_D (actj,bitrate)
{
        if(actj <=2)
                Mismath_Threshold_D = 2000;
        else
                Mismath_Threshold_D = 4000;
        if(bit_rate<100000)
                Mismath_Threshold_D = 5500;
}
``` where actj is a measure of the activity level in the underlying block.

As described above, to detect color-motion artifacts, the motion-compensated color-distance value D is compared with the threshold value T. If the motion-compensated color-distance D is greater than or equal to the threshold value T, the block is identified as containing color-motion artifacts.

Color Motion Artifacts Detection Using Intra/Inter-frame activity

In accordance with another embodiment of the present invention, to detect color-motion artifacts in a frame block, the level of intra-frame activity within the block is compared against the level of inter-frame activity for the block. If any of the y, u and v components (described below) of the inter-frame activity level is greater than or equal to the corresponding component of the intra-frame activity level, the block is identified as containing color-motion artifact(s). The intra-frame activity level associated with a frame block depends on the variation of the pixel values disposed within that frame block. The inter-frame activity level associated with a frame block, on the other hand, depends on the variation between the pixel values of that frame block and the corresponding pixel values of a reference frame block.

Inter-frame activity and intra-frame activity values both may be defined by each of the y, u and v components of the block. The computation of inter-frame activity and intra-frame activity levels are described below.

Computation of Inter/Intra-frame Activity Levels

Intra-frame activity levels $A_{y\text{-}Intra}$, $A_{u\text{-}Intra}$, and $A_{v\text{-}Intra}$ associated respectively with the y, u and v components of a block, are computed as shown below:

$$A_{y\text{-}Intra} = \sum_i \sum_j |y(i,j) - \bar{y}|$$

$$A_{u\text{-}Intra} = \sum_i \sum_j |u(i,j) - \bar{u}|$$

$$A_{v\text{-}Intra} = \sum_i \sum_j |v(i,j) - \bar{v}|$$

where $\bar{y}$, $\bar{u}$ and $\bar{v}$ are respectively the mean values of y, u and v for all the pixels disposed in the block.

Similarly, inter-frame activity levels $A_{y\text{-}Inter}$, $A_{u\text{-}Inter}$, and $A_{v\text{-}Inter}$ associated respectively with the y, u and v components of the frame, are computed as shown below:

$$A_{y\text{-}Inter} = \sum_i \sum_j |y(i,j) - y'(i,j)|$$

$$A_{u\text{-}Inter} = \sum_i \sum_j |u(i,j) - u'(i,j)|$$

$$A_{v\text{-}Inter} = \sum_i \sum_j |v(i,j) - v'(i,j)|$$

where y'(i,j), u'(i,j) and v'(i,j) respectively represent the luminance and chrominance components of the pixel positioned at coordinates (i,j) of the corresponding motion-compensated block of a reference frame.

In accordance with the present invention, if any of the y, u and v components of the inter-frame activity level for a block is greater than the corresponding component of the intra-frame activity level for that block, that block is identified as containing color-motion artifact(s). In other words, the block is identified as containing color-motion artifact(s) if any of the following inequalities are true:

$A_{y\text{-}Inter} > A_{y\text{-}Intra}$ or $A_{u\text{-}Inter} > A_{u\text{-}Intra}$ or $A_{v\text{-}Inter} > A_{v\text{-}Intra}$, Determination of color motion artifacts in accordance with the above embodiments of the present invention involves summing absolute values, and thus requires fewer computations than do the prior art techniques. The reduction of color-motion artifact(s) is described below.

Color Artifact Reduction Using Intra-frame Encoding Mode

In accordance with one embodiment of the present invention, to reduce color-motion artifact(s), video data is encoded using intra-frame encoding. Switching from inter-frame to intra-frame encoding reduces the color-motion artifact(s) while maintaining the compatibility with international video standards. The MPEG-1, MPEG-2, and MPEG-4 video compression standards enable changing the encoding mode from inter-frame to intra-frame at the macroblock level.

Table I below shows the values of the variable length code (VLC) and other associated parameters of the MPEG-1 and MPEG-2 encoding standards for a predictive frame (i.e., P-frame). In Table I, a 1 indicates that that parameter (or feature) printed at the top of the column is selected. A 1 in the last column titled macroblock intra indicates that intra-frame mode is used in encoding of the video data. Therefore, by varying the VLC parameter, the encoding mode of a macroblock of a predictive frame may be changed from inter-frame to intra-frame mode. In the following, macroblock type is alternatively referred to as mb_type.

TABLE I

MPEG-1 and MPEG-2 VLC code table for the mb_type in the predictive frame (P-picture)

| VLC | macroblock quant | macroblock motion forward | macroblock motion backward | macroblock pattern | macroblock intra |
|---|---|---|---|---|---|
| 1 | 0 | 1 | 0 | 1 | 0 |
| 01 | 0 | 0 | 0 | 1 | 0 |
| 001 | 0 | 1 | 0 | 0 | 0 |
| 00011 | 0 | 0 | 0 | 0 | 1 |
| 00010 | 1 | 1 | 0 | 1 | 0 |
| 00001 | 1 | 0 | 0 | 1 | 0 |
| 000001 | 1 | 0 | 0 | 0 | 1 |

Table II below shows a corresponding VLC code and associated parameters of a P-frame according to the MPEG-4 compression standard. As seen from Table II, an mb_type of 3 or 4 encodes P-frames using intra-frame encoding.

TABLE II

MPEG-4 VLC code table for the mb_type in the predictive frame (P-picture)

| VOP Type | mb_type | Name | not_coded | mcbpc | cbpy | dquant |
|---|---|---|---|---|---|---|
| P | not coded | — | 1 | | | |
| P | 0 | INTER | 1 | 1 | 1 | |
| P | 1 | INTER + Q | 1 | 1 | 1 | 1 |
| P | 3 | INTRA | 1 | 1 | 1 | |

TABLE II-continued

MPEG-4 VLC code table for the mb_type in the predictive frame (P-picture)

| VOP Type | mb_type | Name | not_coded | mcbpc | cbpy | dquant |
|---|---|---|---|---|---|---|
| P | 4 | INTRA + Q | 1 | 1 | 1 | 1 |
| P | stuffing | — | | 1 | 1 | |

NOTE "1" means that the item is present in the macroblock

The H.261 and H.263 video standards also include parameters for selecting intra-frame encoding of video data. Consequently, switching from inter-frame to intra-frame encoding to reduce color motion artifacts, in accordance with the present invention, may be implemented in MPEG-1, MPEG-2, MPEG-4, H.261 and H.263 standards.

Scaling Quantization

To reduce color motion artifacts, in accordance with another embodiment of the present invention, the quantization scale is lowered, for example, by at least 1 or 2 steps. In other words, a finer quantization step is used to quantize the DCT signals. If the reduced quantization scale falls below 1, the reduced quantization scale is set to 1.

In accordance with the MPEG-1 and MPEG-2 compression standards (see Table I), the quantization scale may be varied by changing the 5-bit parameter macroblock quant. In the MPEG-4 compression standard (see Table II), the quantization scale is altered via parameter dquant which holds a value representative of the difference between the current and previous quantization scales.

A sample pseudo code for varying the quantization scale is shown below:

```
if   (Color_Artifact_Detected) {
        Quantization_Scale -= 2;
        if (Quantization_Scale <= 1){
                Quantization_Scale = 1;
        }}
```

Figure 3:
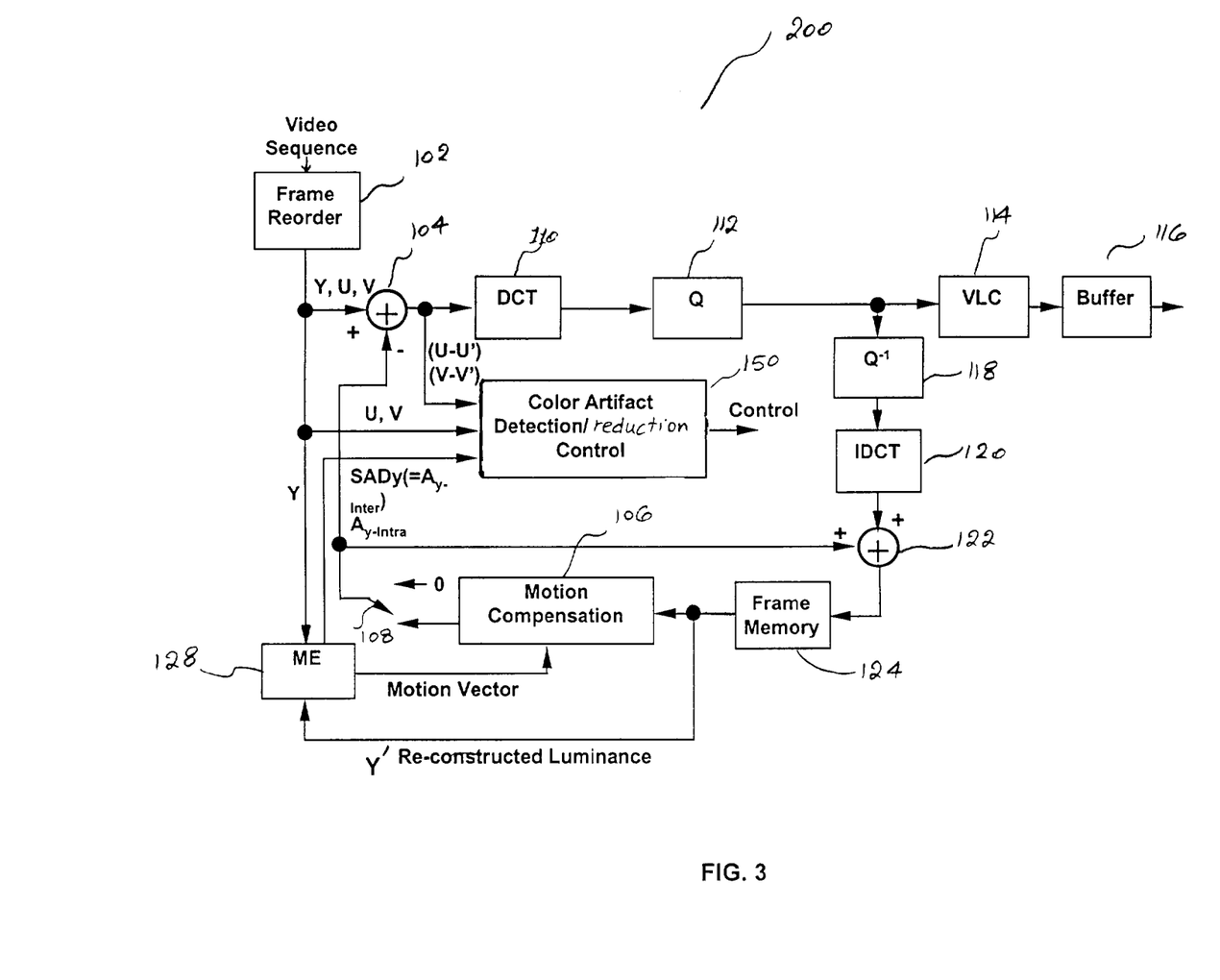
FIG. 3 is a simplified high-level block diagram of a system adapted to detect and reduce color-motion artifacts, in accordance with one embodiment of the present invention.

FIG. 3 is a simplified high-level block diagram of a conventional system 200 adapted to detect color-motion artifacts. System 100 receives a sequence of incoming video frames via frame reorder block 102. In response, frame reorder block 102 serially supplies the (Y,U,V) components of a current frame of the frame sequence to an adder/subtractor 104. Adder/subtractor 104 is also adapted to receive a signal from motion compensation block 106 via selector 108. If selector 108 is in the upper position, then intra-frame coding is used in which case a null signal (i.e., 0) is supplied to adder/subtractor 104. On the other hand, if selector 108 is in the lower position, then inter-frame coding is used. Adder/subtractor 104 generates a signal that corresponds to the difference between the video data supplied by frame reorder block 102 and that supplied by selector 108.

The signal generated by adder/subtractor 104 is supplied to DCT block 110 whose output signal is quantized by a quantizer 112. The quantized signal generated by quantizer 112 is then encoded by VLC 114. The signal encoded by VLC 114 is then stored in buffer 116, which in turn, supplies the encoded video bit stream to a video decoder (not shown).

The signal generated by quantizer 112 is inversely quantized by an inverse quantizer 118 and is subsequently delivered to IDCT 120. IDCT 20 performs an inverse DCT function on the signal it receives and supplies that signal to adder 122. Adder 122 adds the signal it receives from selector 108 to the signal it receives from IDCT 120 and stores the added result in frame memory 124 for future retrieval. The signal stored in frame memory 124 only includes the luma component of a current frame and is adapted to serve as a reference frame for motion estimation and compensation of future frames.

A motion estimator 128 receives the signal stored in frame memory 124 and the signal supplied by frame reorder block 102 to generate a motion vector signal that is supplied to motion compensation block 106. Only the luma components of the current frame—as supplied by frame reorder block 102—and the reference frame—as supplied by frame memory 124—are received and used by motion estimator 128 to generate a motion vector. The motion vector generated by motion estimator 128 is supplied to motion compensator 106. Motion compensator 106, in turn, compensates for the motion of the signal it receives from frame memory 124 using the motion vector signal that it receives from motion estimator 128. The output signal generated by motion compensator 106 is a motion-compensated signal of a current frame and serves as the reference frame for the next incoming frame when inter-frame encoding is used.

There may be occasions when a reference frame is not required. For example, no reference frame is required when a new video sequence is received by system 100. Similarly, there is no need for a reference frame when processing the first frame of a new scene. To accommodate situations where no reference frame is need, selector 108 is provided with an upper position. When placed in the upper position, a null signal (i.e., 0) is transferred to subtracted 104.

After block 150 detects a color motion artifact, block 150 generates a control signal. The control signal either causes the encoding mode to change from inter-frame to intra-frame or causes the quantization scale to change. Block 150, in accordance with the present invention, advantageously performs fewer computations to detect and reduce color-motion artifacts than do prior art systems. In one embodiment, block 150 may include only software modules that are executed by one or more central processing units. In another embodiment, block 150 may by a dedicated hardware logic unit. In yet other embodiment, block 150 may include both hardware and software modules.

The above embodiments of the present invention are illustrative and not limiting. Various alternatives and equivalents are possible. The invention is not limited by the type of integrated circuit in which the present invention may be disposed. Nor is the invention limited to any specific type of process technology, e.g., CMOS, Bipolar, or BICMOS that may be used to manufacture the present invention. Other additions, subtractions or modifications are obvious in view of the present invention and are intended to fall within the scope of the appended claims.

What is claimed is:

1. A method for detecting a color-motion artifact in a block of a video frame, the method comprising:
   computing a motion-compensated color-difference value associated with the block;
   determining an activity level associated with the block, wherein the activity level is indicative of a smoothness of transitions in pixel values disposed in the block;
   selecting a threshold value based on the activity level and a target bit rate associated with the block; and identifying the block as containing a color motion artifact if the motion-compensated color-distance value associated with the block is one of greater than and equal to the threshold value.

2. The method of claim 1 wherein the motion-compensated color-difference value is defined by a sum of squared differences of corresponding red, green and blue component values of similarly located pixels of the block and an associated block of a reference frame.

3. The method of claim 1 wherein the motion-compensated color-difference value is defined by a sum of absolute values of differences of corresponding luminance and chrominance component values of similarly located pixels of the block and an associated block of a reference frame.

4. The method of claim 3 wherein the motion-compensated color-difference value D is defined by $$D \cong a_y \sum_i \sum_j |y(i,j) - y'(i,j)| + a_u \sum_i \sum_j |u(i,j) - u'(i,j)| + a_v \sum_i \sum_j |v(i,j) - v'(i,j)|$$

wherein y(i,j) represents a luminance component of a pixel disposed at coordinates (i,j) of the block and wherein u(i,j) and v(i,j) represent chrominance components of the pixel disposed at coordinates (i,j) of the block, wherein y'(i,j) represents a luminance component of a pixel disposed at coordinates (i,j) of the associated block of the reference frame and wherein u(i,j) and v(i,j) represent chrominance components of the pixel disposed at coordinates (i,j) of the associated block of the reference frame, and wherein $a_y$, $a_u$ and $a_v$ are constants coefficients.

5. The method of claim 1 wherein the threshold value is further inversely proportional to the target bit rate associated with the block.

6. The method of claim 1 wherein the block includes one of 16×16 and 8×8 pixels.

7. The method of claim 1 wherein the block includes the entire video frame.

8. The method of claim 1 further comprising:
reducing the color-motion artifact by selecting a smaller quantization scale.

9. An apparatus adapted to detect a color-motion artifact in a block of a video frame, the apparatus comprising:
a first module for computing a motion-compensated color-difference value associated with the block;
a second module for determining an activity level associated with the block, wherein the activity level is indicative of a smoothness of transitions in pixel values disposed in the block;
a third module for selecting a threshold value based on the activity level and a target bit rate associated with the block; and
a fourth module for identifying the block as containing a color motion artifact if the motion-compensated color-distance value computed for the block is one of greater than and equal to a the threshold value.

10. The apparatus of claim 9 wherein the motion-compensated color-difference value is defined by a sum of squared differences of corresponding red, green and blue component values of similarly located pixels of the block and an associated block of a reference frame.

11. The apparatus of claim 9 wherein the motion-compensated color-difference value is defined by a sum of absolute values of differences of corresponding luminance and chrominance component values of similarly located pixels of the block and an associated block of a reference frame.

12. The apparatus of claim 11 wherein the motion-compensated color-difference value D is defined by $$D \cong a_y \sum_i \sum_j |y(i,j) - y'(i,j)| + a_u \sum_i \sum_j |u(i,j) - u'(i,j)| + a_v \sum_i \sum_j |v(i,j) - v'(i,j)|$$

wherein y(i,j) represents a luminance component of a pixel disposed at coordinates (i,j) of the block and wherein u(i,j) and v(i,j) represent chrominance components of the pixel disposed at coordinates (i,j) of the block, wherein y'(i,j) represents a luminance component of a pixel disposed at coordinates (i,j) of the associated block of the reference frame and wherein u(i,j) and v(i,j) represent chrominance components of the pixel disposed at coordinates (i,j) of the associated block of the reference frame, and wherein $a_y$, $a_u$ and $a_v$ are constants coefficients.

13. The apparatus of claim 9 wherein the threshold value is further inversely proportional to the target bit rate associated with the block.

14. The apparatus of claim 9 wherein the block includes one of 16×16 and 8×8 pixels.

15. The apparatus of claim 9 wherein the block includes the entire video frame.

16. The apparatus of claim 9 wherein each of the first, second, third and fourth modules is a software module.

17. The apparatus of claim 9 wherein each of the first, second, third and fourth modules is a hardware module.

18. The apparatus of claim 9 wherein each of the first, second, third and fourth modules further includes software and hardware modules.

19. The apparatus of claim 9 wherein the color-motion artifact is reduced by selecting a smaller quantization scale.

20. A method for detecting a color-motion artifact in a block of a video frame, the method comprising:
computing a motion-compensated color-difference value associated with the block;
selecting a threshold value based on a target bit rate associated with the block, wherein the threshold value is inversely proportional to the target bit rate; and
identifying the block as containing a color motion artifact if the motion-compensated color-distance value associated with the block is one of greater than and equal to the threshold value.

21. A method for detecting a color-motion artifact in a block of a video frame, the method comprising:
computing a motion-compensated color-difference value associated with the block; and
identifying the block as containing a color motion artifact if the motion-compensated color-distance value associated with the block is one of greater than and equal to the threshold value;
wherein the motion-compensated color-difference value is defined by a luminance coefficient multiplied by a sum of absolute values of differences of corresponding luminance component values of similarly located pixels of the block and an associated block of a reference frame, and a chrominance coefficient multiplied by a sum of absolute values of differences of corresponding chrominance component values of similarly located pixels of the block and the associated block of the reference frame.

* * * * *